United States Patent

[11] 3,600,708

[72] Inventor Philip E. King
Acton, Mass.
[21] Appl. No. 885,840
[22] Filed Dec. 17, 1969
[45] Patented Aug. 17, 1971
[73] Assignee Alpha Industries, Inc.
Newton Upper Falls, Mass.

[54] MICROWAVE LIMITER
7 Claims, 7 Drawing Figs.

[52] U.S. Cl. 333/17, 307/237, 307/320, 333/73 R, 333/73 S
[51] Int. Cl. H03h 7/10, H04b 3/06
[50] Field of Search 333/17, 73, 73 C, 73 W; 328/92; 307/317—319, 320, 237

[56] References Cited

UNITED STATES PATENTS

| | | | |
|---|---|---|---|
| 3,174,119 | 3/1965 | Jones et al. | 333/17 |
| 3,226,661 | 12/1965 | Garver et al. | 333/17 X |
| 3,245,014 | 4/1966 | Plutchok et al. | 333/7 X |
| 3,309,626 | 3/1967 | Higgins | 333/17 |
| 3,448,414 | 6/1969 | Brunton | 333/17 X |
| 3,503,014 | 3/1970 | Hall et al. | 333/7 |
| 3,503,015 | 3/1970 | Coraccio et al. | 333/7 |

*Primary Examiner*—Herman Karl Saalbach
*Assistant Examiner*—Marvin Nussbaum
*Attorney*—Charles Hieken

ABSTRACT: A microwave device for use in limiting an RF signal includes two terminal pairs, an outer conductor defining a cavity and first and second inner conductors within the cavity. Each inner conductor is respectively coupled to a signal terminal of the terminal pairs. Within the cavity, a diode chip has one of its terminals connected to the first inner conductor and its other terminal connected to the outer conductor. A second diode chip, oppositely poled, has one of its terminals connected to the second inner conductor and its other terminal connected to the outer conductor. A third inner conductor within the cavity intercouples the terminals of the diode chips coupled to the inner conductors. Preferably, the first diode chip is a high-power type and the second diode chip rectifies at a lower power level and pumps signal through the first diode chip when high power is incident to the device, thereby limiting the signal level at the output terminal to the rectification level of the second diode chip.

INVENTOR
PHILIP E. KING
BY
Wolf, Greenfield, Hieken & Sacks
ATTORNEYS

INVENTOR
PHILIP E. KING
BY
Wolf, Greenfield, Hieken & Sacks
ATTORNEYS

MICROWAVE LIMITER

BACKGROUND OF THE INVENTION

The present invention relates in general to limiters and more particularly concerns a novel broadband microwave limiter of high electrical performance, small physical form, which is relatively easy and inexpensive to fabricate in large and small quantities for maintaining a high degree of repeatability of electrical performance.

In general, microwave limiters are used to protect more sensitive devices or circuits, such as receivers, mixers and detectors, from a high level input signal. A microwave limiter preferably negligibly attenuates low level signals while heavily suppressing high level signals.

Accordingly, it is an important object of this invention to provide a broadband microwave limiter with the foregoing properties.

It is another object of the invention to provide a microwave limiter in accordance with the preceding object that maintains a relatively low SWR for a broadband of frequencies at low signal levels.

It is another object of the invention to provide a microwave limiter that facilitates convenient location of terminals for connection to external apparatus.

It is another object of this invention to provide a broadband microwave limiter with extremely low loss at low power, high isolation at high power and compact size.

It is another object of this invention to provide a microwave limiter susceptible to sealed or unsealed operation to insure reliable limiting under severe environmental conditions.

It is another object of this invention to provide a microwave limiter in which package parasitics are virtually eliminated, and which may be packaged in an extremely small configuration.

Another object of this invention is to achieve one or more of the preceding objects that is relatively easy and inexpensive to fabricate.

SUMMARY OF THE INVENTION

According to the invention, two terminal pairs are connected to an outer conductor defining a cavity, each terminal pairs having a reference terminal intercoupled by the outer conductor. First and second inner conductors reside within the cavity formed by the outer conductor. The first inner conductor has one end coupled to a signal terminal of one of the terminal pairs and its other end connected to a terminal of a diode chip within the cavity. The other terminal of the diode chip couples to the outer conductor defining the cavity. The second inner conductor couples to the signal terminal of the remaining terminal pair and to a terminal of a second diode chip within the cavity. Likewise, the second diode chip has its remaining terminal coupled to the outer conductor defining the cavity. A third inner conductor within the cavity intercouples the terminals of the diode chips connected to the inner conductors. The two diode chips, forming a pair, are oppositely poled. Within the cavity, the inner conductors coact with the outer conductor to define substantially inductive transmission line segment. The inductive segments, in turn, coact with the capacitance of the nonconducting diode chips to form a substantially reflectionless filter circuit. Preferably, the diode chips are arranged in descending order of rectification level as to the signal input to the device. Thus, when the power level for rectification of the second diode chip is reached, the second diode chip pumps signal through the first diode chip, causing it to conduct, thereby limiting the signal level at the output terminal of the device.

In a modification of the invention, there are two pairs of oppositely poled diode chips intercoupled by a coupling capacitor and serially connected inner conductors. As above the inner conductors coact with the outer conductor defining the cavity to form substantially inductive transmission segments line. The substantially inductive segments, in turn, coact with the capacitance of a nonconducting diode chips to form a substantially reflectionless filter circuit. The diode chips of each pair, likewise, are preferably arranged in descending order of rectification level as to the signal input to the device. Preferably, the diode chip pairs are also arranged in descending order of rectification level. The diode chip pair remote from the input terminal thereby providing low power limiting, while the pair closer to the input signal terminal protects the second pair and limits at a higher level.

Numerous other features, objects and advantages of the present invention will be better understood from the following specification when read in connection with the accompanying drawings in which:

DETAILED DESCRIPTION OF PREFERRED EMBODIMENTS

Corresponding reference symbols identify corresponding elements throughout the drawings where applicable.

Figure 1:
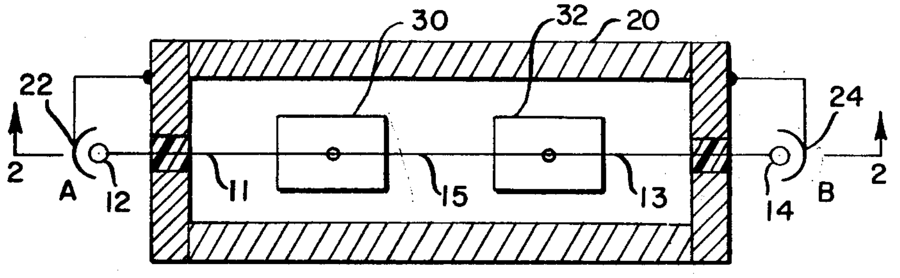
FIG. 1 is a longitudinal section view of the broadband RF limiter having two diode chips according to the invention.

With reference now to the drawings and more particularly to FIG. 1 thereof, there is shown a longitudinal section view of an embodiment of the invention in which the two terminal pairs A and B of the microwave limiters are diagrammatically represented. Inner conductors 11 and 13 are respectively coupled to signal terminals 12 and 14 of terminal pairs A and B. Casing 20 defines the outer conductor for inner conductors 11 and 13 and also intercouples the reference terminals 22 and 24 of terminal pairs A and B, respectively.

Diode chips 30 and 32 are connected between the floor of the cavity formed by outer conductor casing 20 and inner conductors 11 and 13, respectively. Inner conductor 15 intercouples inner conductors 11 and 13.

Figure 2:
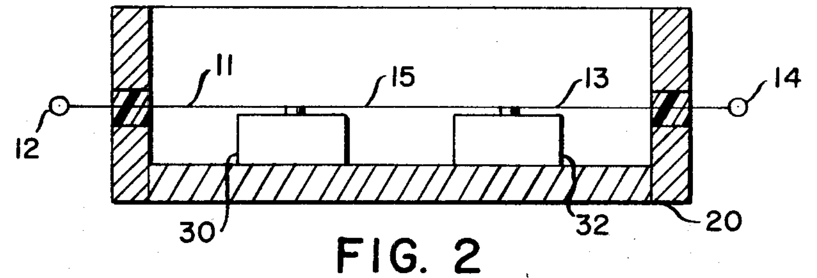
FIG. 2 is a sectional view through section 2–2 of FIG. 1.

FIG. 2 is a sectional view through section 2–2 of FIG. 1 better illustrating the relationship among diode chips 30 and 32, the floor of the cavity formed by outer conductor casing 20 and inner conductors 11, 13 and 15.

Figure 3:
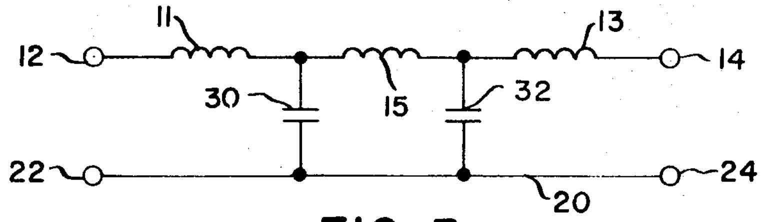
FIG. 3 is a schematic circuit diagram of an embodiment of FIGS. 1 and 2.

FIG. 3 is schematic circuit diagram of the embodiments of FIGS. 1 and 2 illustrating the diode chips in their nonconducting states as substantially capacitive elements. FIG. 3 further illustrates how inner conductors 11, 13 and 15 coact with outer conductor 20 to form a plurality of serially connected substantially inductive distributed parameter transmission line elements represented by inductors 11, 13 and 15. The values of the respective inductors are chosen so that they coact with the shunt-connected substantially capacitive nonconducting chips 30 and 32 to form a substantially reflectionless low pass filter circuit.

Figure 4:
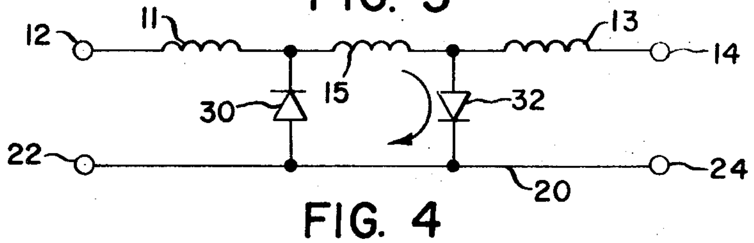
FIG. 4 is a schematic circuit diagram of the embodiment of FIGS. 1 and 1 illustrating the limiting mode of operation.

FIG. 4 is a schematic circuit diagram of an embodiment of FIGS. 1 and 2 in which the diode chips 30 and 32 are oppositely poled. Preferably, diode chip 30 has higher power capability then diode chip 32. As an input signal on terminal 12 increases in level, diode 32 conducts. As diode 32 conducts, a rectified signal pumps through diode chip 32 in the loop comprising diode chips 30 and 32 and conductor 15 (the direction of signal flow noted by the arrow in FIG. 4). As signal level increases diode chip 32 continues to rectify, preventing signal from passing to terminal 14. Thus, the oppositely poled diode pair comprising diode chips 30 and 32 serves to limit the output to a level determined essentially by the rectification level of diode chip 32.

Figure 5:
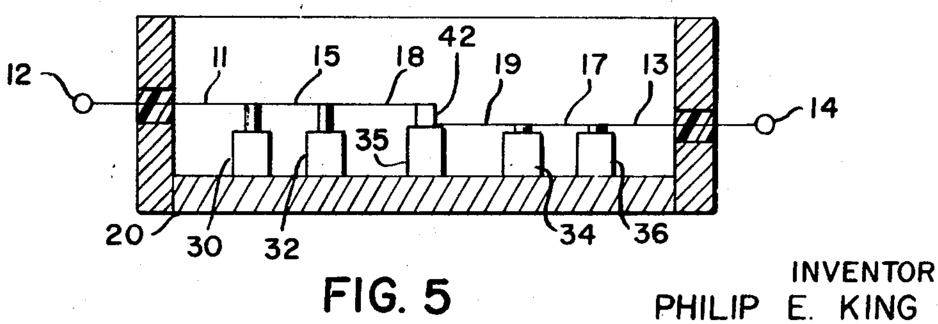
FIG. 5 is a section view of a modification of the invention in which two pairs of diode chips are illustrated.

FIG. 5 is a section view of a modification of the invention in which there are two pairs of diode chips. The pairs, diode chips 30 and 32 are diode chips 34 and 36 are intercoupled by serially connected inner conductor 18, capacitor 42 and inner conductor 19. Preferably, capacitor 42, supported by insulator 35, is adapted for coupling the IF frequencies of interest from one pair to the other. Insulator 35 isolates capacitor 42 and outer conductor 20. The diode chip pairs comprise oppositely poled diode chips, each pair forming a conducting loop limiting the signal at the output terminal 14 when high-power levels are transmitted through the device. Preferably, diode chip pair 34 and 36 rectify at a lower level than diode chip pair 30 and 32. As the signal level on terminal 12 increases in power, diode chip 36 conducts at some level and pumps signal through the loop comprised of diode chip 36, diode chip 34, and inner conductor 17, thereby preventing the output signal level to exceed the rectification level of diode chip 36. As the input power level is increased further, diode chip 32 begins to conduct, and likewise, pumps signal through diode chip 30. At this point, diode chip pair 30 and 32 serve to protect diode chip pair 34 and 36 against damage by the high-power levels incident to the device. One of the diode chip pairs, as for example diode chip pair 30 and 32, may be adapted to react instantaneously to high incident power levels, thereby providing spike leakage protection for the device.

Figure 6:
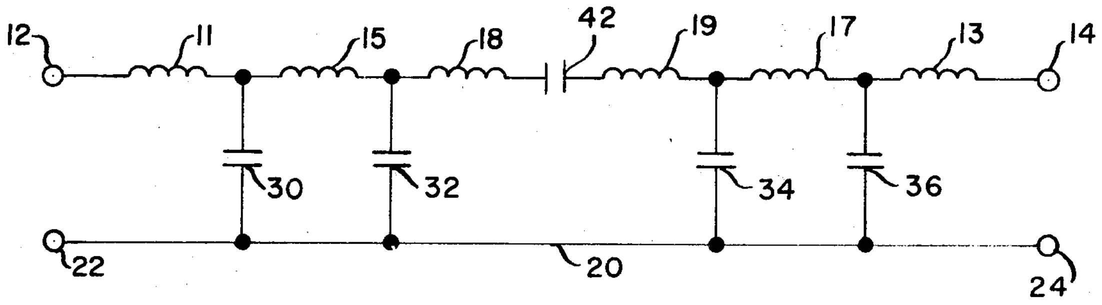
FIG. 6 is a schematic diagram of the embodiment of FIG. 5.

FIG. 6 is a schematic circuit diagram of a modification of the invention in which the diode chips in the nonconducting states are represented as substantially capacitive elements. Capacitor 42, intercoupling inductive elements 18 and 19, may be a coupling capacitor, as above, or may be chosen to provide frequency or impedance matching for the circuit. Again, inner conductors, 11, 13, 15, 17, 18 and 19 coact with outer conductor 20 to form substantially inductive transmission line segments.

Figure 7:
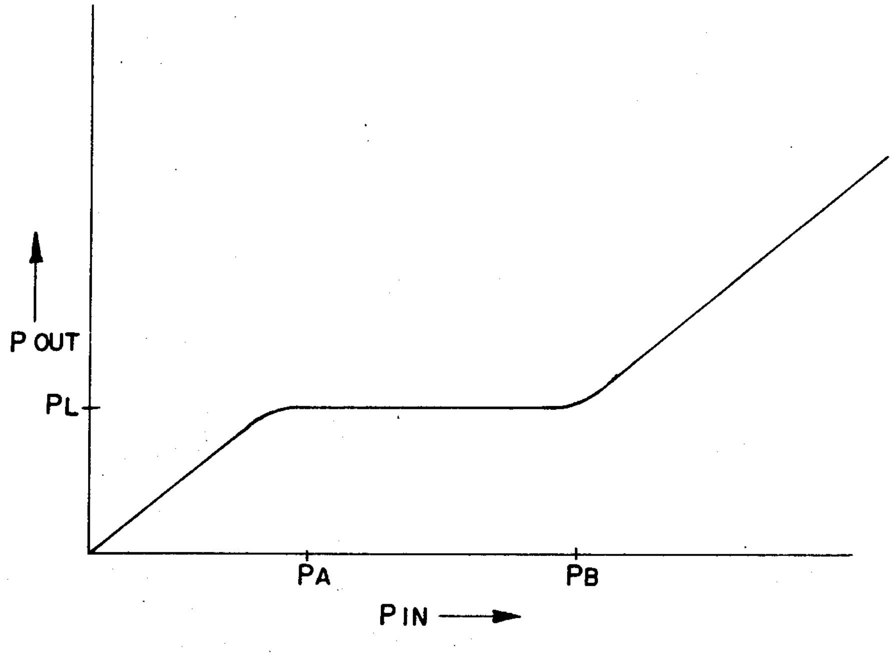
FIG. 7 is a graph of input power versus output power for the invention.

Referring now to FIG. 7, there is shown a plot of output power vs. input power for the invention. As the input power increases, the output power increased proportionally (attenuated by the minimal loss of the nonconducting diode chips and the conductors of the device). As input power is increased further, the pair of diode chips conducting at the lowest level begins to limit the output power, and substantially no increase in output power occurs until diode saturation occurs. The limiter then exhibits the properties of an attenuator until the diode chips reach their maximum power handling capability.

In a specific embodiment of the invention, 50 ohm type axial terminals were used in an outer conductor casing of Kovar material, 0.532 inch long. The cavity formed within the outer conductor was 0.337×0.150 inch. Two hundred pf. capacitors were used as coupling capacitors connecting the inner conductors to the signal terminals of the connectors. 0.005 inch by 0.001 inch gold ribbon was used as the inner conductor within the cavity. Two pairs of diode chips were used within the cavity with a 200 pf. capacitor. The coupling capacitor was supported by a low capacitance block dielectric support which also minimized shock and vibration. The first pair of oppositely poled diode chips included a PIN diode chip and a high voltage varactor diode chip adapted for conduction in the 70—90 volt range. The PIN diode chip was capable of handling the maximum power and protected the diode chips further into the device. The high voltage varactor diode chip was adapted to pump rectified signal through the PIN diode chip when high power was incident to the device. The second pair of diode chips was a lower power limiting pair than the first pair but also oppositely poled. A low voltage varactor-type diode chip adapted for conduction in the neighborhood of 50 volts provided a return path for a conducting Schottky diode. The limiter operated over a frequency range of 0.5 to 4 GHZ with an insertion loss of 1.5 db. at a −10 dbm. power level. At a −20 dbm. power level a VSWR of 1.7 was achieved with a maximum CW power leakage of 5 mw. The peak power leakage observed (1 kw. at 1 microsecond) was 10 mw. maximum. The response time achieved for a 1 kw. pulse was 1 nanosecond maximum, and the maximum input power was 8 watts.

An important feature of the invention is the adaptability of the device to accommodate different types of diode chips. The choice of the diode chips being made on: the conduction level of the diodes, the capacitance of the diode chips in their nonconducting states, the insertion loss desired, the power handling capability and the limiting level to be achieved.

Another important feature of the invention is the adaptability of the structure to accommodating terminals at different locations. FIG. 1 shows terminals at opposite ends of the longitudinal axis of the limiter. But the invention operates well with the terminals in space quadrature or at other angles.

The invention is illustrated with a rectangular cavity formed by the outer conductor casing. The cavity may be cylindrical or in any other suitable shape. The limiter may also be constructed of two parallel plates forming a transmission line with diode chips being mounted on one or both of the plates. The limiter may be constructed in microstrip or any other TEM waveguide configuration. The terminals of the device may be coaxial, lug terminals, or any other type of terminals to allow convenient use of the invention. Moreover, axial or strip terminals may be fitted to the device so that it may be integrally combined with other devices, as for example in a microwave integrated circuit.

Another important feature of the invention is that the entire device may be enclosed in an extremely small package. The diode chips may be integrated into a filter network exclusive of their packages and the parasitics thereof. Thus, extremely wide bandwidths may be obtained, as for example 200 MHz to 12 GHZ and sometimes higher.

Preferably, capacitive DC blocks may intercouple the signal terminals to the inner conductors within the cavity so as to prevent rectified signal from escaping the diode pair loops. But the invention works well with DC blocks external to the device. Thus, the low frequency limitation of the invention may be determined by the value of the capacitance of the DC blocks.

Virtually any number of pairs of diode chips may be used. In order that conducting loops are established for each pair, the pairs are preferably isolated from one another. Also, triads of diode chips may be utilized, provided that at least one of the diode chips is oppositely poled from the others. Thus, two conducting loops may be formed, instead of the one conducting loop occurring with a pair of diode chips. Again, the diode chip closest to the input signal terminal may be of high-power handling capability and serve to protect diode chips remote from the input terminal from a higher power signal.

Another feature of the invention is that the diode chips may be mounted directly upon a conducting surface which may serve as a metal heat sink, thereby raising the power handling capability of the device.

Other modifications and uses of and departures from the specific embodiments described herein may be practiced by those skilled in the art without departing from the inventive concepts. Consequently, the invention is to be constructed as embracing each and every novel feature and novel combination of features present in or possessed by the apparatus and techniques herein disclosed and limited solely by the spirit and scope of the appended claims.

What I claim is:

1. High frequency apparatus comprising,
conducting means defining a cavity,
first and second inner conductors within said cavity,
first and second terminal pairs with each pair having a reference terminal intercoupled by said conducting means,
said first terminal pair having a signal terminal coupled to an end of said first inner conductor,
said second terminal pair having a signal terminal coupled to an end of said second inner conductor,
means defining at least first and second diode chips within said cavity, said first diode chip interconnecting the remaining end of said first inner conductor in rectifying contact with said conducting means and conductive only in response to at least a first predetermined signal level on said first inner conductor, said second diode chip interconnecting the remaining end of said second inner conductor in rectifying contact with said conducting means and conductive only in response to at least a second predetermined signal level on said second inner conductor that is less than said first predetermined signal level, and means including a third inner conductor intercoupling said first and second inner conductors, said diode chips poled for opposite conduction on application of an RF signal to said inner conductors, said first, second and third inner conductors comprising substantially inductive means coacting with the effective capacitance of said diode chips in their nonconducting states between said inner conductors and said conducting means to define a substantially reflectionless filter circuit.

2. High frequency apparatus as set forth in claim 1 and further comprising first and second capacitive means for respectively coupling said first and second inner conductors to the first and second signal terminals respectively.

3. High frequency apparatus comprising, conducting means defining a cavity, first and second inner conductors within said cavity, first and second terminal pairs with each pair having a reference terminal intercoupled by said conducting means, said first terminal pair having a signal terminal coupled to an end of said first inner conductor, said second terminal pair having a signal terminal coupled to an end of said second inner conductor, means defining at least first, second, third and fourth diode chips within said cavity, a third inner conductor intercoupling oppositely poled terminals of said first and second diode chips, said first and second diode chips intercoupled with said conducting means by their remaining terminals thereby forming a first pair of oppositely poled diode chips, said first and second diode chips conductive only in response to at least first and second predetermined signal levels respectively on said third inner conductor, said third and fourth diode chips conductive only in response to at least third and fourth predetermined signal levels on said fourth inner conductor, said first and second signal levels being greater than said third and fourth signal levels respectively, a fourth inner conductor intercoupling oppositely poled terminals of said third and fourth diode chips, said third and fourth diode chips intercoupled with said conducting means by their remaining terminals thereby forming a second pair of oppositely poled diode chips, and means intercoupling said first and second inner conductors including, said third and fourth inner conductors and a fifth inner conductor, said fifth inner conductor intercoupling said third and fourth inner conductors thereby intercoupling said first and second pairs, said first, second, third, fourth and fifth inner conductors comprising substantially inductive means coacting with the effective capacitance of said diode chips in their nonconducting states between said inner conductors and said conducting means to define a substantially reflectionless filter circuit.

4. High frequency apparatus as set forth in claim 1 wherein said first diode chip includes means defining a PIN diode chip and said second diode chip includes means defining a varactor diode chip.

5. High frequency apparatus as set forth in claim 3 wherein said first diode chip includes means defining a PIN diode chip and said second diode chip includes means defining a varactor diode chip.

6. High frequency apparatus in accordance with claim 3 wherein said first predetermined signal level is greater than said third predetermined signal level.

7. High frequency apparatus in accordance with claim 3 wherein said second predetermined signal level is greater than said predetermined signal level.